US007878931B2

(12) United States Patent
Angiuli

(10) Patent No.: US 7,878,931 B2
(45) Date of Patent: Feb. 1, 2011

(54) DRIVE MECHANISM FOR BARRIER OPERATOR

(75) Inventor: Ralph C. Angiuli, Canfield, OH (US)

(73) Assignee: Overhead Door Corporation, Lewisville, TX (US)

( * ) Notice: Subject to any disclaimer, the term of this patent is extended or adjusted under 35 U.S.C. 154(b) by 1019 days.

(21) Appl. No.: 11/135,760

(22) Filed: May 24, 2005

(65) Prior Publication Data

US 2006/0265956 A1 Nov. 30, 2006

(51) Int. Cl.
*F16H 7/02* (2006.01)
*E05F 11/00* (2006.01)

(52) U.S. Cl. ........................................ 474/167; 49/199

(58) Field of Classification Search ................. 474/167; 49/32, 118, 199; 254/264

See application file for complete search history.

(56) References Cited

U.S. PATENT DOCUMENTS 2,670,065 A * 2/1954 Stevens, Jr. ............... 192/18 R
3,566,706 A * 3/1971 Fix ............................ 474/265
3,797,171 A * 3/1974 Farmer ........................ 49/360
4,026,343 A * 5/1977 James ......................... 160/189
4,564,098 A * 1/1986 Hormann ..................... 192/150
4,822,324 A 4/1989 Georget
4,900,294 A * 2/1990 Schneeberger .............. 474/167
4,977,704 A * 12/1990 Koenig ........................ 49/362
5,579,878 A * 12/1996 Hsieh .......................... 192/223
5,839,555 A * 11/1998 Hsieh ...................... 192/223.1
6,033,331 A 3/2000 Winninger et al.
2003/0221929 A1* 12/2003 Chen et al. .................... 192/83

* cited by examiner

*Primary Examiner*—Robert A Siconolfi
*Assistant Examiner*—Stephen Bowes
(74) *Attorney, Agent, or Firm*—Gardere Wynne Sewell LLP; Kenneth R. Glaser

(57) ABSTRACT

An electric motor driven barrier operator includes spaced apart frame plates for supporting the motor, an intermediate drive shaft and an operator final output shaft. The motor output shaft, intermediate shaft and final output shaft are mounted on bearings at fixed centers on the frame plates and the motor and intermediate shaft are interconnected by a stretchable flexible drive belt reeved over respective drive pulleys mounted on the motor output shaft and the intermediate shaft. The drive belt may be mounted on the pulleys and replaced without adjusting the position of the motor output shaft, the intermediate shaft or the operator output shaft.

5 Claims, 5 Drawing Sheets

DRIVE MECHANISM FOR BARRIER OPERATOR

BACKGROUND OF THE INVENTION

Motorized door operators are known which include an electric motor driving a final output shaft by way of a belt or chain drive and intermediate shafts interposed the motor output shaft and the final output shaft. Depending on the type of door to be driven by the operator and the location of the operator, a relatively complex speed reduction drive train may be interposed an intermediate shaft and the final output shaft.

In all events, once a motor driven door operator of the general type discussed herein is mounted in its working position, it is often difficult to gain access to the operator for servicing or for replacement of wear items, such as endless drive belts. With conventional door operators, the motor support structure or an intermediate shaft is adjustable to adjust tension for and to replace endless drive belts. This adjustment or replacement activity is difficult to carry out when door operators are mounted high above the floor and not near any support structure which can be relied on to provide access by servicing personnel. Moreover, belt tension adjustment is subject to error which can cause premature belt and/or bearing failure. Accordingly, there has been a need to provide a door operator wherein the motor support means is not required to be moved nor is there any requirement to move an intermediate shaft driven by the motor output shaft by way of an endless belt. However, an improved overall drive mechanism arrangement, together with the provision of a stretchable endless drive belt in the mechanism drive train with belt drive pulleys located at fixed drive shaft centers, is provided by the present invention.

SUMMARY OF THE INVENTION

The present invention provides an improved motorized door operator of a type which includes a drive motor and at least one intermediate or final output shaft driven by the motor by way of a stretchable endless drive belt.

In accordance with one aspect of the present invention, a motorized door operator is provided with opposed support plates, a drive motor mounted on at least one of the support plates and therebetween and an intermediate shaft supported by the support plates at a fixed distance from the motor and drivenly connected to the motor by way of a stretchable endless drive belt.

In accordance with another aspect of the present invention, a motorized door operator is provided which includes an improved arrangement of drive mechanism, including intermediate and final output shafts, a drive train interconnecting the shafts and drive mechanism connected to a limit switch mechanism. The particular drive mechanism for the operator of the present invention is more easily and quickly assembled, initially, and more easily and quickly serviced if belt replacement is required, without requiring adjustment of the motor output shaft axis of rotation with respect to an intermediate shaft or the operator final output shaft.

Those skilled in the art will further appreciate the advantages and superior features of the invention upon reading the detailed description which follows in conjunction with the drawings.

DETAILED DESCRIPTION OF THE PREFERRED EMBODIMENTS

Figure 1:
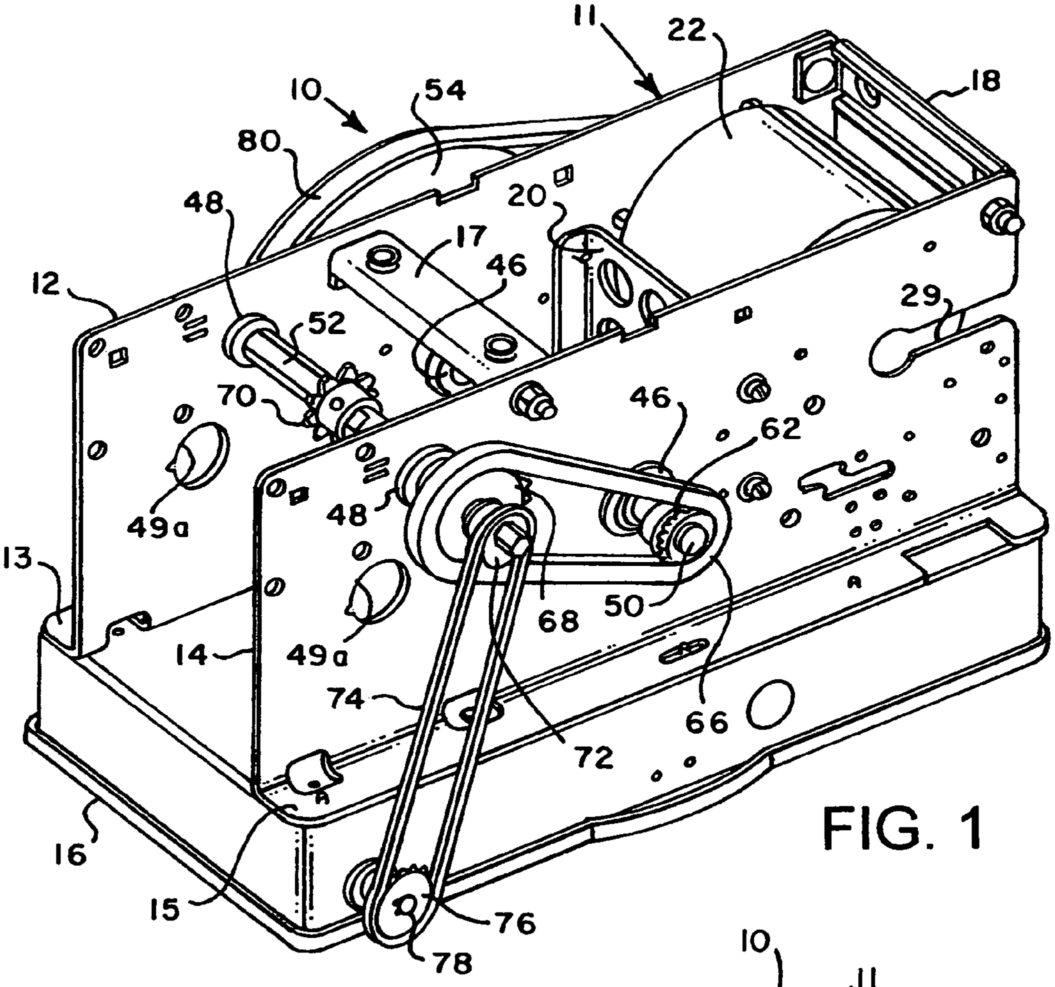
FIG. 1 is a perspective view of one preferred embodiment of a motorized door operator in accordance with the invention.

In the description which follows, like parts are marked throughout the specification and drawings with the same reference numerals, respectively. The drawings may not be to scale and certain features may be shown in generalized or somewhat schematic form in the interest of clarity and conciseness.

Figure 2:
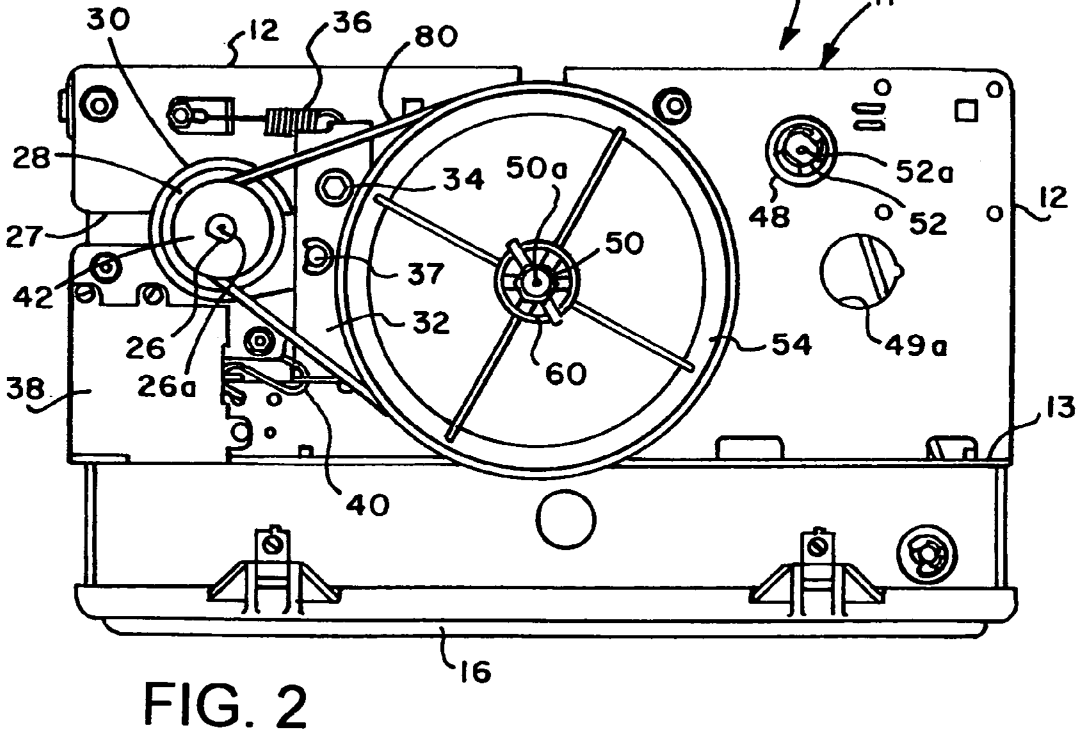
FIG. 2 is a side elevation of the door operator shown in FIG. 1.

Referring to FIGS. 1 and 2, there is illustrated a motorized door operator in accordance with the invention and generally designated by the numeral 10. The operator 10 comprises a frame 11 characterized by opposed generally rectangular metal plates 12 and 14 which are provided, respectively, with transverse mounting flanges 13 and 15 for mounting a control system enclosure 16 thereon, as illustrated. The frame plates 12 and 14 may also be interconnected by spaced apart support brackets 17 and 18 and a transverse plate 20, see FIGS. 1, 3 and 4. Support brackets 17, 18 and frame plate 20 may be suitably secured to the frame plates 12 and 14 by conventional mechanical fasteners whereby the frame of the operator 10 may be easily assembled and disassembled, if needed.

Figure 3:
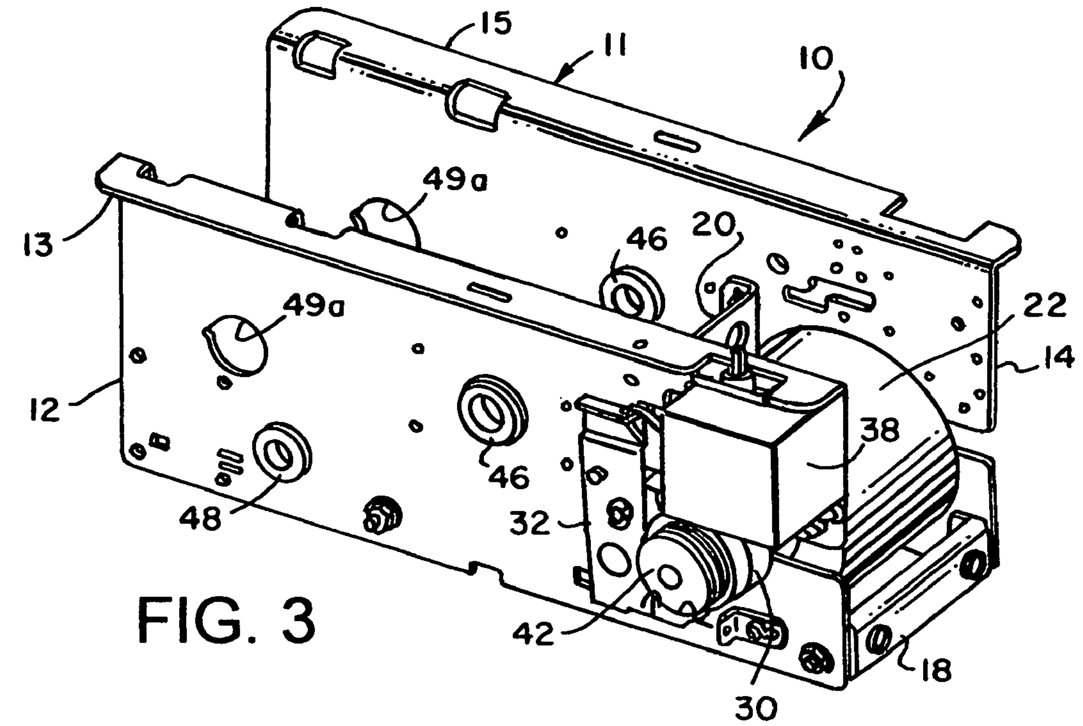
FIG. 3 is a perspective view of the frame of the operator shown in FIGS. 1 and 2 with the intermediate and final output shafts removed therefrom.
Figure 4:
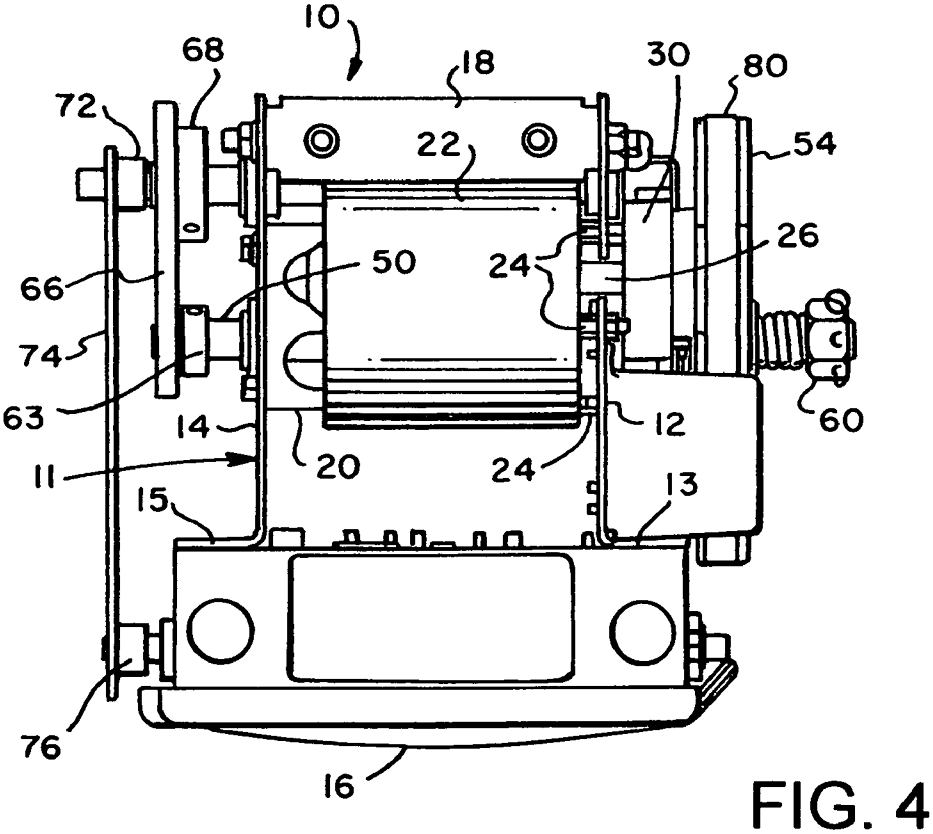
FIG. 4 is an end view of the operator shown in FIGS. 1 and 2.

The operator 10 also includes an electric drive motor 22 supported between the frame plates 12 and 14 and supported on the frame plate 12 by spaced apart fasteners 24, see FIG. 4, for example. Frame plates 12 and 14 may be configured as substantially mirror images of each other and motor 22 may be mounted on frame plate 14 with shaft 26 projecting through a slot or opening 29, FIG. 1, if desired. Motor 22 is provide with a rotary output shaft 26 projecting through a suitable slot 27 in frame plate 12, see FIG. 2. Motor output shaft 26 includes a brake drum 28 mounted thereon, FIG. 2, and engageable with a movable brake band 30, see FIGS. 2, 3 and 4. Brake band 30 is operably connected to a brake actuating arm 32, FIG. 2, which is mounted for pivotal movement about a pivot 34 and is biased into a brake engaged position by a coil spring 36. Brake actuating arm 32 is connected to brake band 30 at a connecting pin 37, as also shown in FIG. 2. A solenoid actuator 38 is connected to arm 32 by a link 40 for releasing the brake when the solenoid actuator is energized.

Figure 5:
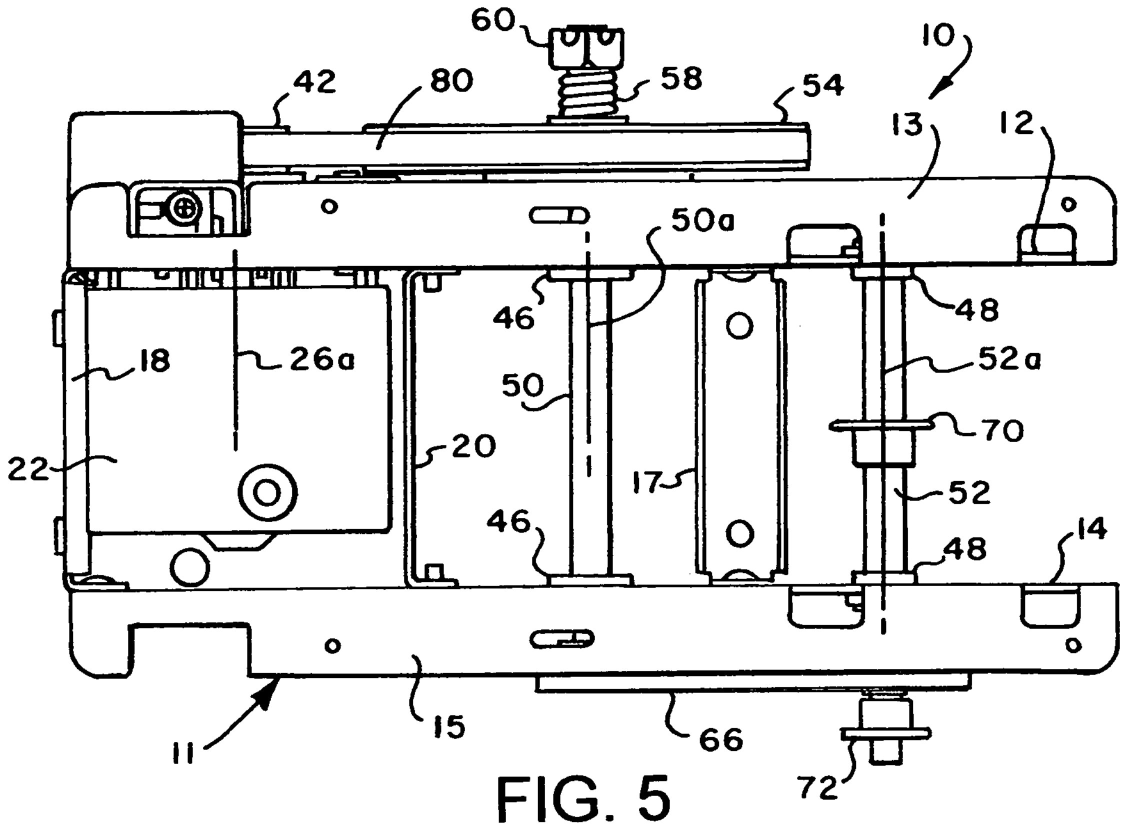
FIG. 5 is a bottom plan view of the operator shown in FIGS. 1 and 2 with a control system enclosure removed from the operator frame.
Figure 6:
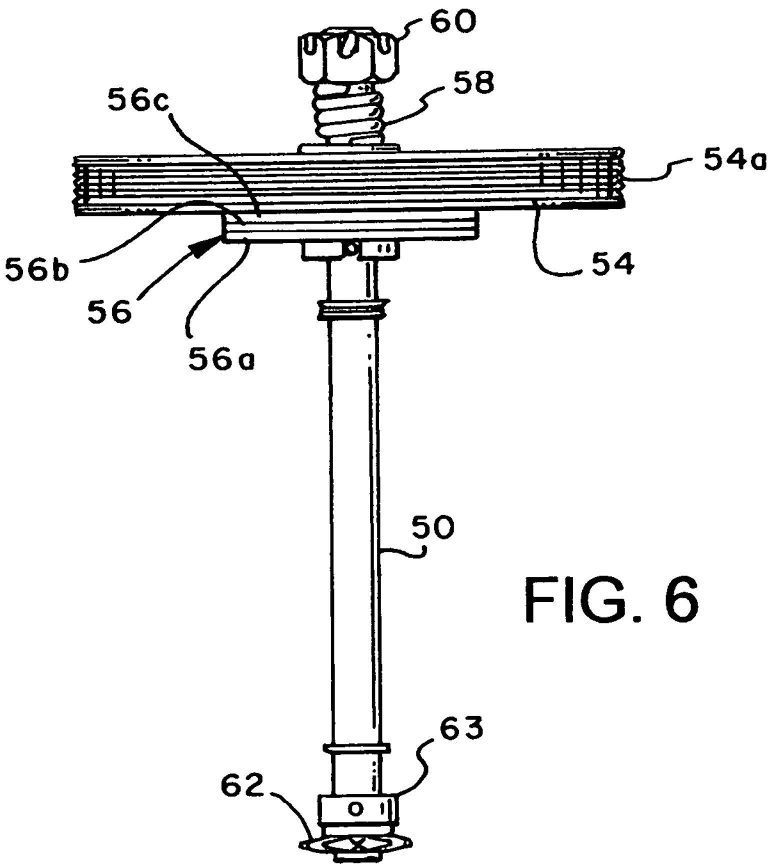
FIG. 6 is a side elevation of the intermediate shaft assembly for preferred embodiments of the operator of the present invention.

Motor 22 is drivingly connected to a belt drive pulley 42, see FIGS. 2 and 3. As shown in FIG. 3, frame plates 12 and 14 are adapted to support spaced apart bearings 46 and 48, see FIG. 1 also, with bearings 46 and 48 being received in respective openings in the frame plates and whereby the axial centers of the bearings 46 and 48 are fixed with respect to the frame plates. Bearings 46 are adapted to support a rotatable intermediate shaft 50, FIGS. 1, 2 and 5, and bearings 48 are adapted to support a rotatable final output shaft 52, wherein shafts 50 and 52 are rotatable with respect to the frame plates 12 and 14. Referring briefly to FIG. 6, intermediate shaft 50 supports a grooved belt driven pulley 54 for rotation therewith by way of a torque limiting clutch 56. Clutch 56 normally engages pulley 54 with shaft 50 for forming a driving connection therebetween. Clutch 56 is operable to slip to allow relative rotation between members 50 and 54. The torque at which clutch 56 slips may be adjusted by adjusting the compression of a coil type spring 58 sleeved over shaft 50, the compression of which may be adjusted by an adjustment nut 60. Shaft 50 is also drivingly connected to a chain sprocket 62 suitably keyed to the shaft 50 at the end of the shaft opposite the end supporting the pulley 54 and the clutch 56. Clutch 56 includes a driven plate 56*a* suitably keyed to shaft 50, a clutch face 56*b* and a driving plate 56*c* mounted on or keyed to pulley 54.

As shown in FIG. 1, chain sprocket 62 is engaged with an endless drive chain 66 which is engaged with a sprocket 68 fixed to operator final output shaft 52. Output shaft 52 also supports a drive sprocket 70 disposed between plates 12 and 14 and operable to be connected to a barrier trolley chain, not shown. Output shaft 52 is also drivingly connected to and supports a drive sprocket 72 engaged with an endless chain 74 which in turn, is engaged with a sprocket 76 mounted on a rotatable limit switch shaft 78. Limit switch shaft 78 and associated mechanism disposed in enclosure 16 may be similar to that disclosed in copending U.S. patent application Ser. No. 10/989,479, filed Nov. 16, 2004 by Michael T. McMahon et al. and assigned to the assignee of the present invention.

As shown in FIGS. 1, 2, 4 and 5, an endless flexible belt 80 is trained over pulleys 42 and 54 to form a driving connection between motor output shaft 26 and intermediate shaft 50. Belt 80 is preferably formed of an elastic polyamide cord and is operable to be elongated or "stretched" elastically from two percent to ten percent of its nominal length so that it may be slipped over the rims of grooved pulleys 42 and 54 without changing the position of the shafts 26 or 50 with respect to each other. Accordingly, shaft centers or axes 26*a*, 50*a* and 52*a*, FIG. 2, may remain fixed with respect to each other and frame 11. Moreover, the tension stability of the belt 80 is superior to conventional flexible drive belts. The belt 80 may be of a type commercially available under the trademark FLEXONIC and may be of a type disclosed in U.S. Pat. No. 4,822,324 to Georget, for example.

By providing the endless belt 80 drivingly interconnecting the motor output shaft 26 with an intermediate or output shaft 50 for the operator 10, the location of the motor 22 may remain fixed with respect to the frame plates 12 and 14 and the bearing support structure for the shaft 50 may also remain fixed which is the case for the operator 10. Those skilled in the art will appreciate that with the complexity of the operator drive mechanism, including the motor 22 and its output shaft, the intermediate shaft 50 and the final drive shaft 52 that to make these shafts adjustable with respect to frame 11 would be unnecessarily complicating and burdensome to assemblers and service technicians. In fact, with the typical mounting arrangement of a door operator, such as the operator 10, access to the operator for making adjustments or repairs is often difficult and somewhat hazardous for service personnel. Accordingly, the need to minimize any assembly, adjustment or replacement work with regard to a wear item, such as a flexible drive belt, is important.

Figure 7:
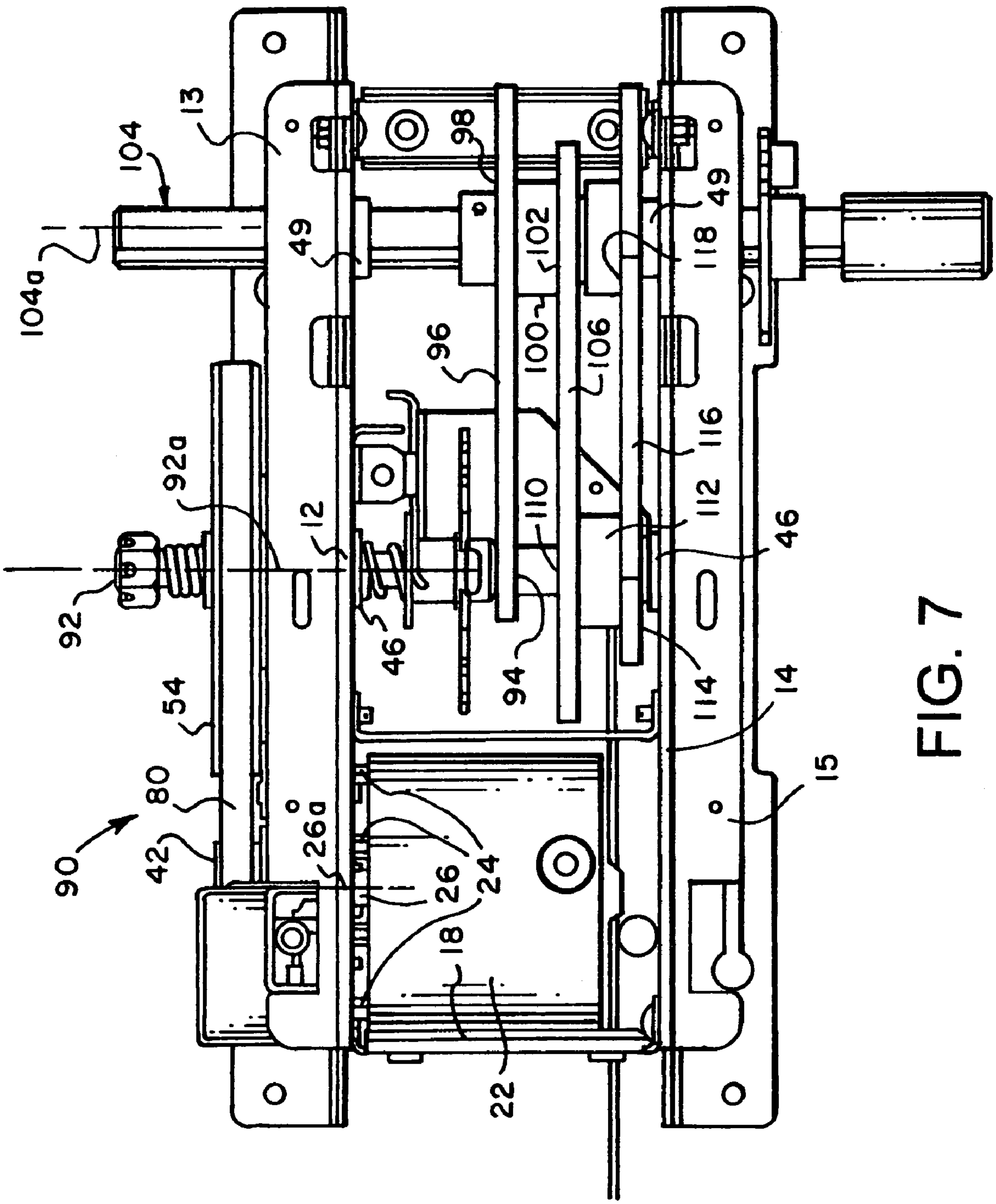
FIG. 7 is a plan view similar to FIG. 5, of another preferred embodiment and showing a complex speed reduction drive train interposed the motor output shaft and the operator final output shaft.

The complexity of operators similar to the operator 10, may be recognized by viewing FIG. 7 where an alternate embodiment of the invention is illustrated and generally designated by the numeral 90. The operator 90 is also provided with a frame 11 including spaced apart frame plates 12 and 14. A motor 22 is mounted on frame plate 12 in the same manner as for the operator 10 and drivingly connected to an intermediate shaft assembly 92 by way of pulleys 42 and 54 and a belt 80. The drive train for operator 90, including shaft 92, is of increased complexity in that shaft 92 is drivingly connected to a chain sprocket 94 which, in turn, is engaged with an endless chain 96 which is engaged with an idler sprocket 98. Idler sprocket 98 is mounted on a bushing or hub 100 which also supports an idler sprocket 102 for rotation therewith on and relative to an output shaft 104 of operator 90. Idler sprocket 102 is drivingly connected to an endless chain 106 connected to an idler sprocket 110 which is mounted on a bushing or hub 112 rotatable on and supported by shaft 92 and also drivingly connected to yet another idler sprocket 114 drivingly connected to an endless chain 116. Endless chain 116 is drivingly engaged with an output sprocket 118 mounted on and drivingly engaged with shaft 104.

Accordingly, the operator 90 provides an output shaft 104 which is of substantially reduced rotative speed relative to the rotational speed of motor 22 and the complexity of the drive mechanism including the shafts 92 and 104 and the mechanism interconnecting the shafts is such that the mounting positions of these shafts cannot be easily adjusted. Shaft 92 is fixed with respect to frame plates 12 and 14 and is mounted in bearings 46, and shaft 104 is mounted in suitable bearings 49 similar to bearings 48 but of larger bore capacity. Bearings 49 are mounted on the respective frame plates 12 and 14 in openings 49*a*, see FIG. 1, for example, in a manner substantially like that provided for bearings 48. The operator 90 also enjoys the benefits of the elastically stretchable flexible drive belt 80. The centers or axes 26*a*, 92*a* and 104*a* of the respective drive shafts 26, 92 and 104 do not require adjustment with respect to each other, which would be unduly complicating for construction, use and repair of the operator 90, and a predetermined tension in belt 80 is fixed whereby the belt is not subject to insufficient or excessive tension due to improper adjustment.

Figure 8:
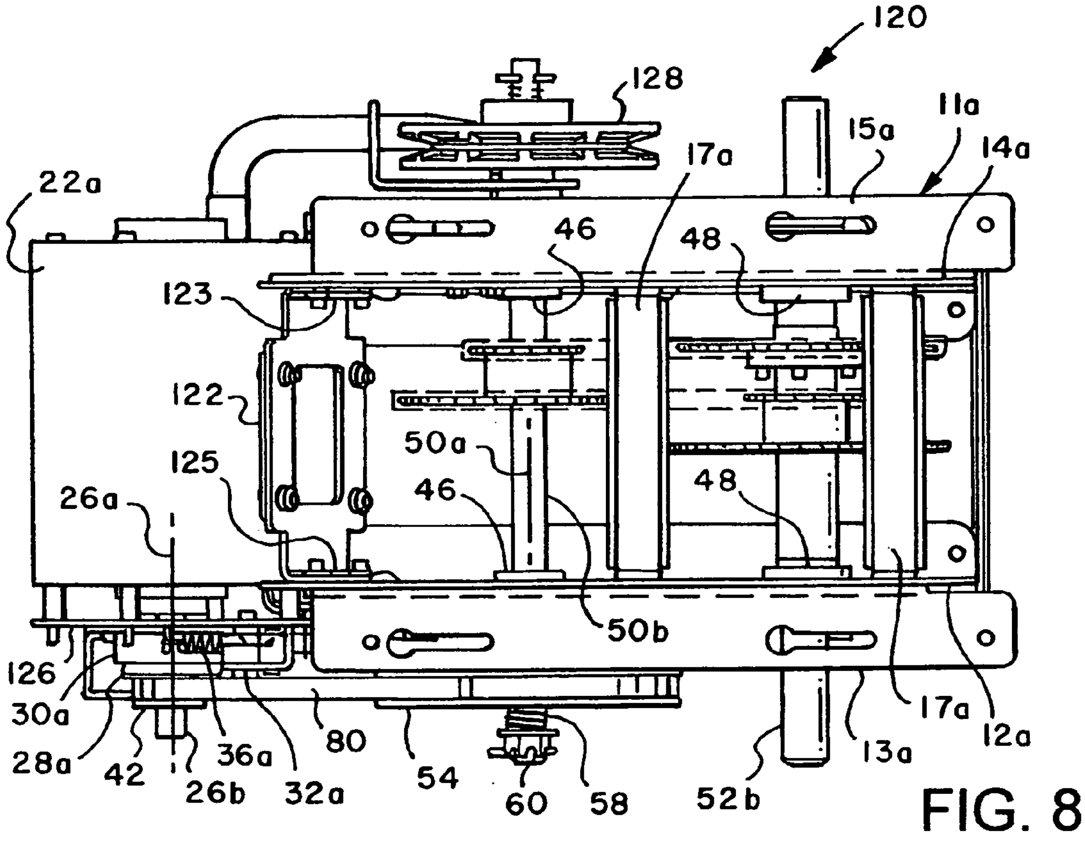
FIG. 8 is a plan view of still another preferred embodiment of a door operator.
Figure 9:
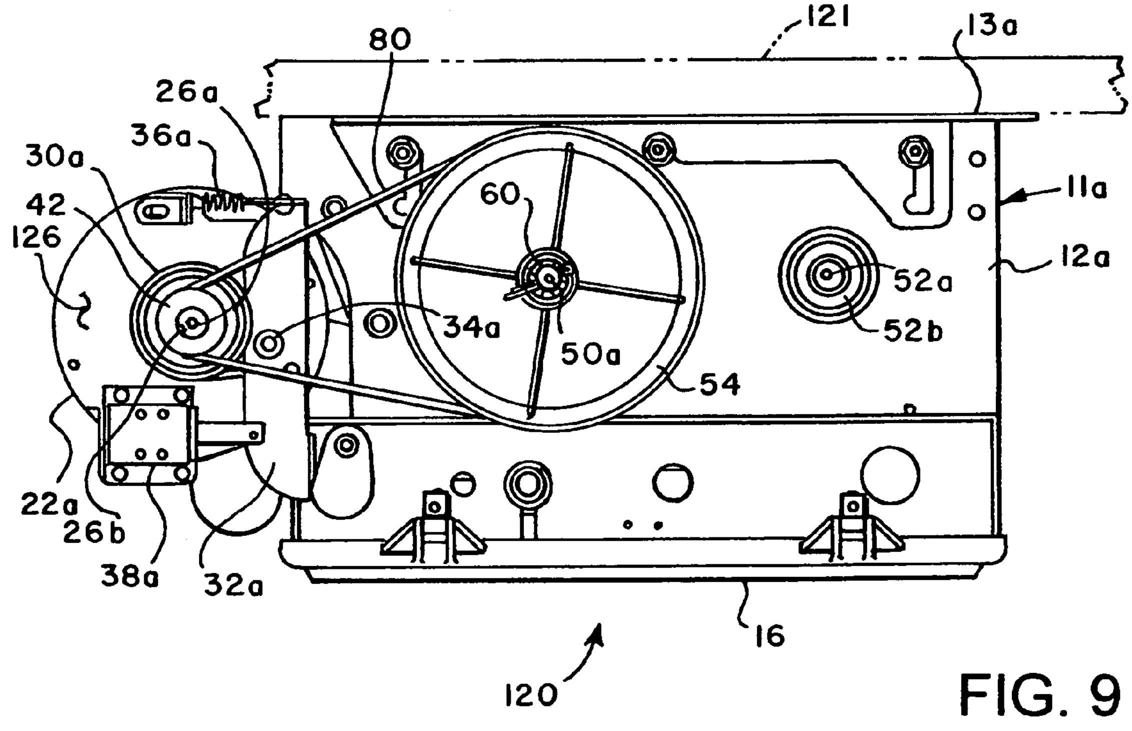
FIG. 9 is a side elevation of the operator shown in FIG. 8.

Referring now to FIGS. 8 and 9, still another preferred embodiment of a barrier operator in accordance with the invention is illustrated and generally designated by the numeral 120. The operator 120 is similar in many respects to the operators 10 and 90 and includes a frame 11*a* comprising opposed frame plates 12*a* and 14*a* which are interconnected by brackets 17*a*, FIG. 8, and by a somewhat channel-shaped motor support bracket 122 which is secured to a motor 22*a* similar in most respects to the motor 22. However, motor 22*a* is modified with respect to its housing for connection to the support bracket 122 in a so-called foot type mounting. Motor support bracket 122 includes opposed flanges 123 and 125, FIG. 8, which are secured, respectively, to the frame plates 14*a* and 12*a* by conventional mechanical fasteners. Accordingly, motor 22*a* is also mounted in a fixed position with respect to the frame 11*a*. Frame mounting flanges 13*a* and 15*a* are provided for the operator 120 and are adjustable with respect to the frame plates 12*a* and 14*a* for adjusting the position of the frame 11*a* with respect to a support structure 121, FIG. 9.

Motor 22*a* also includes a rotatable output shaft 26*b* having a belt drive pulley 42 mounted thereon. A modified intermediate shaft 50*b* is supported in bearings 46 and in a fixed position on frame plates 12*a* and 14*a*. Intermediate shaft 50*b* is adapted to support a drive pulley 54 in the same manner as for the operator 10. A brake band 30*a* is engageable with a brake drum 28*a* also generally in the same manner as for the operator 10. Brake band 30*a* is connected to a movable arm 32*a* and to a solenoid actuator 38*a*. Actuator 38*a* and brake arm 32*a* are mounted on a suitable support plate 126 which is supported by motor 22*a*. A coil spring 36*a* is also supported by plate 126 and is operable to bias the arm 32*a* to rotate about pivot 34*a* to engage the brake band to provide braking action for the motor output shaft 26*b*.

The distance between the centers of pulleys 42 and 54 is fixed by the fixed axes of rotation of the shafts 26*b* and 50*b*, as indicated by axes 26*a* and 50*a*. Again, as with the operators 10 and 90, the complexity of the transmission between intermediate shaft 50*b* and output shaft 52*b* of the operator 120 is such that the transmission power train is not adapted for ease of adjusting the position of the shafting. The utilization of belt 80, which is trained around pulleys 42 and 54 of operator 120, is advantageous. Additional complexity of the operator 120 is provided by a chain hoist mechanism 128 suitably mounted on one end of shaft 50*b* opposite the end which includes the adjustment nuts 60 and the torque limiting clutch biasing spring 58. Bearings 46 and 48 support the shafts 50*b* and 52*b* as illustrated in a manner similar to the arrangement for the operator 10.

Those skilled in the art will appreciate that the overall arrangement of the operators 10, 90 and 120 is advantageous with respect to construction and use. Conventional engineering materials and practices may be used to fabricate and operate the operators 10, 90 and 120 and a commercially available and advantageous drive belt 80 may be utilized in connection with assembly and repair of the operators, when required. Although preferred embodiments of the invention have been described in detail herein, those skilled in the art will recognize that various substitutions and modifications may be made without departing from the scope and spirit of the appended claims.

What is claimed is:

1. In a motorized operator for moving a barrier between open and closed positions, a frame including spaced apart generally parallel elongated frame plates, spaced apart frame members interconnecting said frame plates, an electric motor mounted on said frame in a fixed position, a motor output shaft projecting through one of said frame plates, an intermediate shaft mounted for rotation on said frame in bearings supported on respective ones of said frame plates, an output shaft mounted for rotation on said frame in spaced apart bearings supported on said frame plates, respectively, said bearings for said intermediate shaft and for said output shaft being fixed on said frame plates, respective chain sprockets mounted on said intermediate shaft and said output shaft and a chain trained over said sprockets, said output shaft further comprising a second sprocket disposed between said parallel elongated frame plates for moving a door, and a third sprocket drivingly connected to a sprocket disposed on separate and spaced apart rotatable limit switch shaft, respective pulleys mounted on said motor output shaft and said intermediate shaft and a stretchable endless drive belt trained over said pulleys, said stretchable endless drive belt formed of an elastic polyamide cord and being stretchable between about two percent to ten percent of its nominal length, whereby said intermediate shaft is driven by said motor, the distance between axes of rotation of said motor output shaft and said intermediate shaft is fixed and a predetermined tension in said stretchable belt is fixed.

2. The operator set forth in claim 1 wherein:

said intermediate shaft and said output shaft are interconnected by a speed reduction drive mechanism comprising plural sprockets supported on said intermediate shaft and said output shaft and interconnected by plural drive chains, at least selected ones of said sprockets being mounted on hubs which are rotatable relative to said intermediate shaft and said output shaft, respectively.

3. The operator set forth in claim 1 including:

bearing support means on said frame plates for supporting an output shaft in a selected working position with respect to said frame plates.

4. The operator set forth in claim 1 including:

a brake drum mounted on said motor output shaft and a releasable brake member engageable with said brake drum, said brake drum and said brake member being mounted outboard of said one frame plate supporting said motor.

5. The operator set forth in claim 1 including:

a control enclosure supported by and interconnecting said frame plates, respectively.

* * * * *